(12) United States Patent
Chang et al.

(10) Patent No.: US 10,157,252 B2
(45) Date of Patent: Dec. 18, 2018

(54) METHOD AND APPARATUS OF A THREE DIMENSIONAL INTEGRATED CIRCUIT (71) Applicant: Taiwan Semiconductor Manufacturing Company, Ltd., Hsin-Chu (TW)

(72) Inventors: Chi-Wen Chang, Yuanlin Township (TW); Hui Yu Lee, Hsin-Chu (TW); Ya Yun Liu, Jhubei (TW); Jui-Feng Kuan, Zhubei (TW); Yi-Kan Cheng, Taipei (TW)

(73) Assignee: Taiwan Semiconductor Manufacturing Company, Hsin-Chu (TW)

(*) Notice: Subject to any disclaimer, the term of this patent is extended or adjusted under 35 U.S.C. 154(b) by 286 days.

(21) Appl. No.: 15/154,630

(22) Filed: May 13, 2016

(65) Prior Publication Data
US 2016/0259877 A1 Sep. 8, 2016

Related U.S. Application Data (62) Division of application No. 14/137,679, filed on Dec. 20, 2013, now Pat. No. 9,355,205.

(51) Int. Cl.
G06F 17/50 (2006.01)
H01L 23/48 (2006.01)
(Continued)

(52) U.S. Cl.
CPC ...... G06F 17/5077 (2013.01); G06F 17/5072 (2013.01); H01L 23/481 (2013.01); H01L 25/0657 (2013.01); G06F 2217/02 (2013.01); G06F 2217/66 (2013.01); H01L 21/76898 (2013.01); H01L 23/528 (2013.01); H01L 2225/06541 (2013.01); H01L 2924/0002 (2013.01)

(58) Field of Classification Search
CPC ............ G06F 17/5068; G06F 17/5077; G06F 2217/66; G03F 7/0037
USPC ................................. 716/119, 126
See application file for complete search history.

(56) References Cited

U.S. PATENT DOCUMENTS

2005/0067620 A1 3/2005 Chan et al.
2010/0118501 A1 5/2010 Hazucha et al.
(Continued)

FOREIGN PATENT DOCUMENTS

CN 1604306 A 4/2005
CN 1949468 A 4/2007
JP 2010507225 A 3/2010

Primary Examiner — Paul Dinh
(74) Attorney, Agent, or Firm — Slater Matsil, LLP (57) ABSTRACT An apparatus includes a first tier and a second tier. The second tier is above the first tier. The first tier includes a first cell. The second tier includes a second cell and a third cell. The third cell includes a first inter layer via (ILV) to couple the first cell in the first tier to the second cell in the second tier. The third cell further includes a second ILV, the first ILV and the second ILV are extended along a first direction. The first tier further includes a fourth cell. The second tier further includes a fifth cell. The second ILV of the third cell is arranged to connect the fourth cell of the first tier with the fifth cell of the second tier. In some embodiments, the second tier further includes a spare cell including a spare ILV for engineering change order (ECO) purpose.

20 Claims, 6 Drawing Sheets (51) Int. Cl.
 *H01L 25/065* (2006.01)
 *H01L 21/768* (2006.01)
 *H01L 23/528* (2006.01)

(56) References Cited

U.S. PATENT DOCUMENTS

| | | |
|---|---|---|
| 2010/0127333 A1 | 5/2010 | Hou et al. |
| 2012/0047480 A1* | 2/2012 | Yamaoka ............ G06F 17/5077 |
| | | 716/129 |
| 2012/0304142 A1 | 11/2012 | Morimoto et al. |
| 2014/0332979 A1* | 11/2014 | Cicalo .................. H01L 23/481 |
| | | 257/774 |

* cited by examiner

METHOD AND APPARATUS OF A THREE DIMENSIONAL INTEGRATED CIRCUIT

PRIORITY CLAIM

This application is a divisional and claims the benefit of U.S. patent application Ser. No. 14/137,679, filed on Dec. 20, 2013, entitled "Method and Apparatus of a Three Dimensional Integrated Circuit," which application is hereby incorporated herein by reference.

FIELD OF DISCLOSURE

The present disclosure is related to integrated circuits and, more particularly, to a three dimensional integrated circuits (3DIC).

BACKGROUND

Developments in integrated circuit technology have focused on improving the integration density of various electronic components (e.g., transistors, capacitors, diodes, resistors, inductors, etc.) into a given chip or wafer area. Various improvements have involved the reduction of minimum component size, permitting more components to be integrated on the semiconductor die or wafer. Such two dimensional (2D) integration density improvements are physically limited by aspect ratios of devices, dimensions of dies, design rules of technology nodes, etc.

Three dimensional integrated circuits (3DIC) are used to resolve some of the limitations of 2D integrated circuits. Plural dies are stacked vertically within a single package and electrically connected to each other. Through substrate vias (TSVs) are often used in stacked wafer/die packaging structures to connect the wafers or dies. TSVs are vertical openings passing completely though semiconductor substrates and filled with conductive material to provide connections between stacked wafers or dies. The total interconnect length of the integrated circuits in 3DIC is decreased compared to corresponding ones in 2D integrated circuit.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Making and using various embodiments of the disclosure are discussed in detail below. It should be appreciated, however, that the embodiments provide many applicable inventive innovations that can be embodied in a wide variety of specific contexts. The specific embodiments discussed are merely illustrative, and do not limit the scope of the disclosure.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top," and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, unless expressly described otherwise.

Some embodiments have one or a combination of the following features and/or advantages. An apparatus includes a first tier and a second tier. The second tier is above the first tier. The first tier includes a first cell. The second tier includes a second cell and a third cell. The third cell includes a first inter layer via (ILV) to couple the first cell in the first tier to the second cell in the second tier. The third cell further includes a second ILV, the first ILV and the second ILV are extended along a first direction. The first tier further includes a fourth cell. The second tier further includes a fifth cell. The second ILV of the third cell is arranged to connect the fourth cell of the first tier with the fifth cell of the second tier. In some embodiments, the second tier further includes a spare cell including a spare ILV for engineering change order (ECO) purpose.

Figure 1:
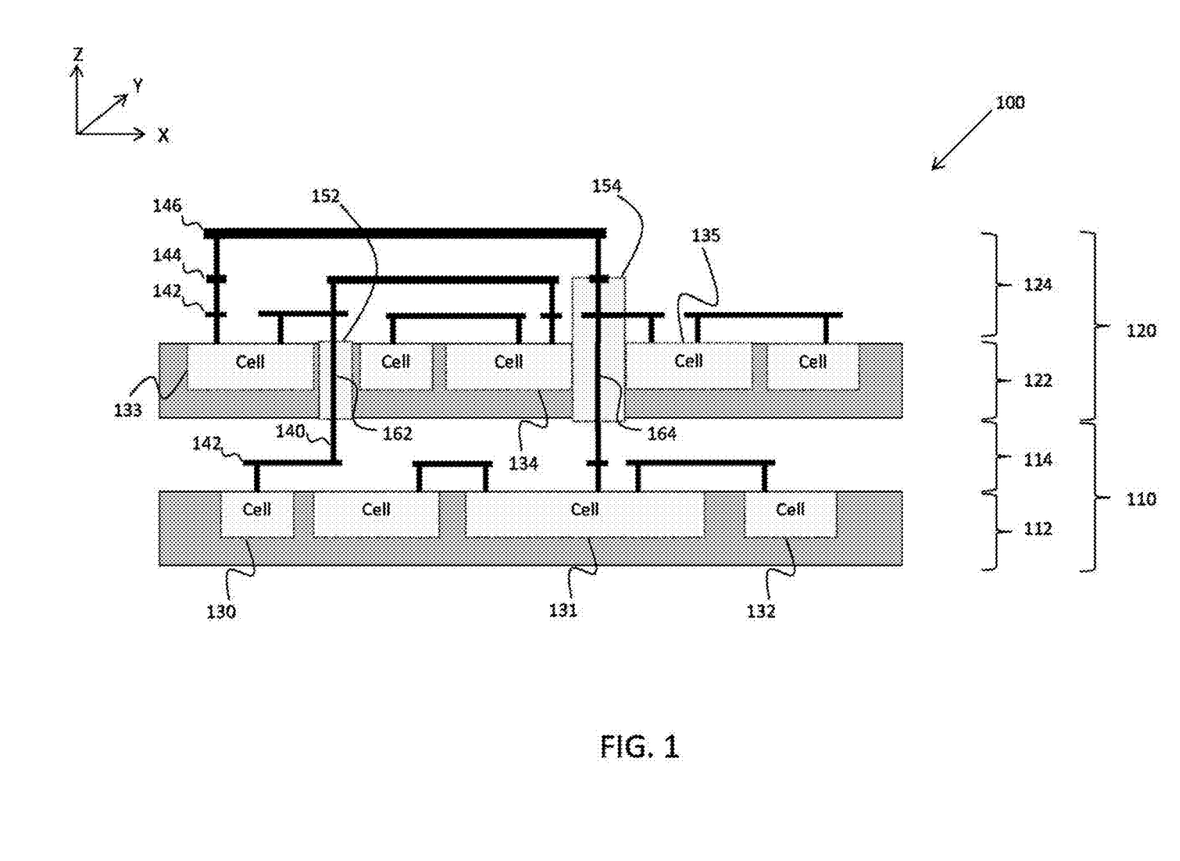
FIG. 1 is a cross sectional view of a three dimension integrated circuit 100 in accordance with some embodiments.

FIG. 1 is a cross sectional view of a three dimension integrated circuit (3DIC) 100 according to some embodiments. For simplicity, the 3DIC 100 only includes necessary components for illustration purpose. In FIG. 1, various metal layers and via layers are overlapped. The 3DIC 100 includes a first tier 110 and a second tier 120 stacked on the first tier 110. The first tier 110 includes a substrate 112 and a metallization layer 114. The second tier 120 includes a substrate 122 and a metallization layer 124. Each of the metallization layers 114 and 124 is a multi-layer material including stacked conductive lines extending in X-Y plane parallel to a top surface of the first and second substrates 112 and 122. Furthermore, each of the metallization layers 114 and 124 further includes conductive vias connecting corresponding conductive lines on adjacent layers. Each of the metallization layers 114 and 124 includes a dielectric material configured to insulate the conductive lines and conductive vias. In some embodiments, the dielectric material includes a low-k dielectric material. In some embodiments, a low-k dielectric material has a dielectric constant less than that of silicon dioxide. For simplicity, the terms metal line and conductive line are used interchangeably in this disclosure and such use should not limit the scope of the claims appended herewith.

In some embodiments, at least one of the first substrate 112 and the second substrate 122 includes an elementary semiconductor including silicon or germanium in crystal, polycrystalline, or an amorphous structure; a compound semiconductor including silicon carbide, gallium arsenic, gallium phosphide, indium phosphide, indium arsenide, and indium antimonide; an alloy semiconductor including SiGe, GaAsP, AlInAs, AlGaAs, GaInAs, GaInP, and GaInAsP; any other suitable material; or combinations thereof. In some embodiments, the alloy semiconductor substrate has a gradient SiGe feature in which the Si and Ge composition change from one ratio at one location to another ratio at another location of the gradient SiGe feature. In some embodiments, the alloy SiGe is formed over a silicon substrate. In some embodiments, at least one of the first substrate 112 and the second substrate 122 is a strained SiGe substrate. In some embodiments, one of the first substrate 112 and the second substrate 122 has a semiconductor on insulator structure, such as a silicon on insulator (SOI) structure. In some embodiments, at least one of the first substrate 112 and the second substrate 122 includes a doped epi layer or a buried layer. In some embodiments, at least one of the first substrate 112 and the second substrate 122 has a multilayer structure, or the substrate includes a multilayer compound semiconductor structure.

A plurality of cells (e.g., cells 130-135) is formed on the substrate 112 of the first tier 110 and the substrate 122 of the second tier 120, respectively. For simplicity, only six cells are labeled. In some embodiments, the space between e.g., cells 131 and 132 includes cells that are not shown for simplicity purpose. In some embodiments, the space between e.g., cells 131 and 132 includes a shallow trench isolation (STI) region (not shown). In some embodiments, one of the cells in the substrates 112 and 122 is a cell in a standard cell library configured to have specific functionalities such as AND, OR, NAND, NOR, XOR, XNOR, buffer, inverter, multiplexer, flip-flop, latch, or the like. In some embodiments, one of the cells in the substrates 112 and 122 is an intellectual property (IP) block configured to have specific functionalities, such as an adder, a multiplier, a PLL, a slave component in the on-chip bus, etc.

In some embodiments, the metallization layer 114 includes metal one lines 142 and conductive vias 140 between the substrate 112 and the metal one lines 142 (for example, conductive via zero), and between the metal one lines 142 and the substrate 122 (for example, conductive via one). In some embodiments, the metallization layer 124 includes metal one lines 142, metal two lines 144, metal three lines 146, and conductive vias 140 between the substrate 122 and the metal one lines 142, and between respective metal lines 142, 144 and 146. For example, conductive via one is disposed between the metal one line 142 and metal two line 144, the conductive via two is disposed between the metal two line 144 and the metal thee line 146. For simplicity, the conductive via zero, conductive via one and conductive via two in respective metallization layers 114 and 124 are hereinafter collectively referred to as conductive via 140.

In some embodiments, a layer of metal one line is also referred to herein as M1. In some embodiments, a layer of metal two line is also referred to herein as M2. In some embodiments, a layer of metal three line is also referred to herein as M3. For simplicity, only two metal one lines 142, one metal two line 144, one metal three line 146 and one conductive via 140 are labeled. The metallic layers and via layers used in this disclosure are for illustration purpose and such use should not limit the scope of the claims appended herewith.

The second tier 120 further includes cell 152 and cell 154. The cell 152 includes an inter layer via (ILV) 162 that extends through the substrate 122. In some embodiments, the cell 152 includes a plurality of ILVs that extend through the substrate 122 and are in parallel with each other. In some embodiments, an inter device via (IDV) is used in place of the ILV. For simplicity, the terms ILV and IDV are used interchangeably in this disclosure and such use should not limit the scope of the claims appended herewith. In some embodiments, the ILV 162 includes copper, aluminum, nickel, titanium, tungsten or other suitable conductive material. In some embodiments, the ILV 162 includes a same material as the conductive lines and the conductive vias in the metallization layers 114 and 124.

The ILV 162 is formed in Z direction in the substrate 122. Furthermore, the ILV 162 in the substrate 122 provides an electrical connection between the metallization layer 114 and 124 through the substrate 122. In some embodiments, the cell 130 in the substrate 112 of the first tier 110 electrically connects through a first interconnection path to the cells 133-134 in the substrate 122 of the second tier 120. The first interconnection path includes the ILV 162 of the cell 152 and metal lines and conductive vias in respective metallization layer 114 and 124.

The cell 154 includes an ILV 164 formed in Z direction in the substrate 122. In some embodiments, the cell 154 includes a plurality of ILVs that extend through the substrate 122 and are in parallel with each other. The ILV 164 in the substrate 122 provides an electrical connection between the metallization layer 114 and 124 through the substrate 122. In some embodiments, the cell 154 further includes metal lines and conductive vias in the metallization layer 124. In some embodiments, the cell 131 in the substrate 112 of the first tier 110 electrically connects through a second interconnection path to the cells 133, 135 in the substrate 122 of the second tier 120. The second interconnection path includes the ILV 164 of the cell 154 and metal lines and conductive vias in respective metallization layer 114 and 124.

Figure 2A:
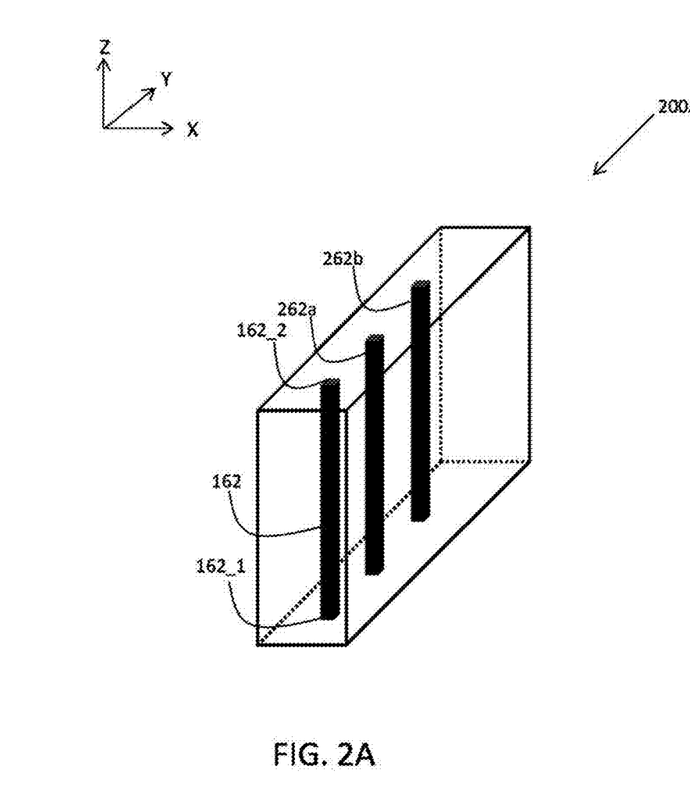
FIG. 2A is a three-dimensional perspective view of a cell 200A in accordance with some embodiments.

FIG. 2A is a three-dimensional perspective view of a cell 200A according to some embodiments. The cell 200A is an example of the cell 152 in FIG. 1. With respect to the embodiments of FIG. 1, like elements in FIG. 2A are designated with the same reference numbers for ease of understanding. The cell 200A includes ILVs 162, 262*a* and 262*b* extended along Y direction as a column. For simplicity, only three ILVs of a column are shown in the cell 200A. It is understood that any number of ILVs or any number of columns is within the scope of various embodiments. The ILV 162 and 262*a*-262*b* are formed in Z direction and in parallel with each other. Furthermore, the ILV 162 includes a first port 162_1 and a second port 162_2. In some embodiments, the cell 130 in FIG. 1 electrically connects through conductive lines and conductive vias in the metallization layer 114 to the first port 162_1 of the ILV 162 in FIG. 2A. Furthermore, the second port 162_2 of the ILV 162 electrically connects through conductive lines and conductive vias in the metallization layer 124 to cells 133-134. In such a situation, the cell 130 of the first tier 110 in FIG. 1 electrically connects through the ILV 162 of the cell 200A to the cells 133-134 of the second tier 120 in FIG. 1. In some embodiments, an electronic design automation (EDA) placement tool is configured to insert the cell 152 in the substrate 122 near the cells 130 and 133-134 such that EDA routing tool is configured to electrically connect the cells 130 and 133-134 through the ILV 162 of the cell 152.

In some embodiments, the substrate 112 of the first tier 110 in FIG. 1 further includes a first cell different from the cell 130; the substrate 122 of the second tier 120 in FIG. 1 further includes a second cell different from the cells 133-134. One of the ILVs 262a and 262b is arranged to connect the first cell in the substrate 112 with the second cell in the substrate 122.

In some embodiments, one of the ILVs 262a and 262b is a spare ILV reserved for possible engineering change order (ECO) in the future. For example, in FIG. 1, after fabrication of the second tier 120, connectivity of the 3DIC 100 is revised to additionally couple the cell 132 to the cell 135. In such a situation, the cell 132 can be arranged to connect through the ILV 262a to the cell 135 without re-generating masks of the substrate 122. As a result, mask cost is significantly reduced and turn around time (TAT) is shortened.

Figure 2B:
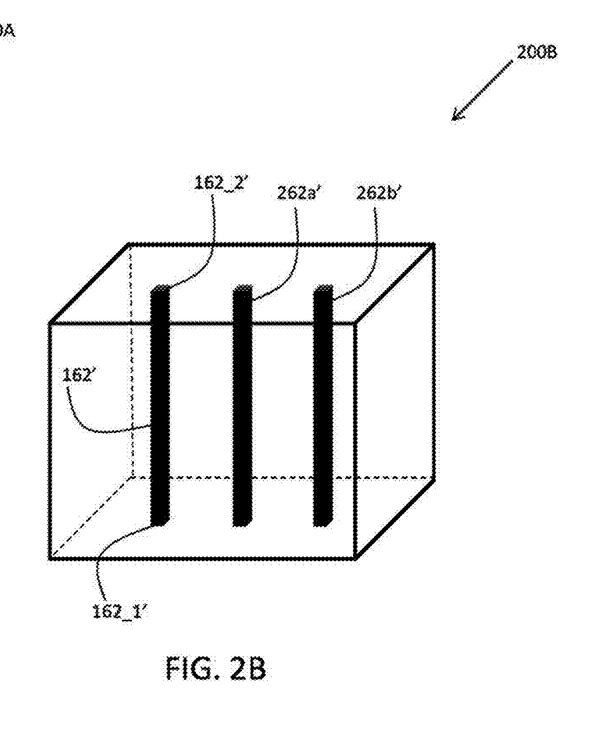
FIG. 2B is a three-dimensional perspective view of a cell 200B in accordance with some embodiments.

FIG. 2B is a three-dimensional perspective view of a cell 200B according to some embodiments. The cell 200B is another example of the cell 152 in FIG. 1. With respect to the embodiments of FIG. 1, like elements in FIG. 2B are designated with the same reference numbers for ease of understanding. The cell 200B includes ILVs 162', 262a' and 262b' extended along X direction as a row. For simplicity, only three ILVs of a row are shown in the cell 200B. It is understood that any number of ILVs or any number of rows is within the scope of various embodiments. The ILV 162' and 262a'-262b' are formed in Z direction and in parallel with each other. Furthermore, the ILV 162' includes a first port 162_1' and a second port 162_2'. In some embodiments, the cell 130 in FIG. 1 electrically connects through conductive lines and conductive vias in the metallization layer 114 to the first port 162_1' of the ILV 162' in FIG. 2B. Furthermore, the second port 162_2' of the ILV 162' electrically connects through conductive lines and conductive vias in the metallization layer 124 to cells 133-134. In such a situation, the cell 130 of the first tier 110 in FIG. 1 electrically connects through the ILV 162' of the cell 200B to the cells 133-134 of the second tier 120 in FIG. 1. In some embodiments, one of the ILVs 262a' and 262b' is spare ILV reserved for possible engineering change order (ECO) in the future.

Figure 3:
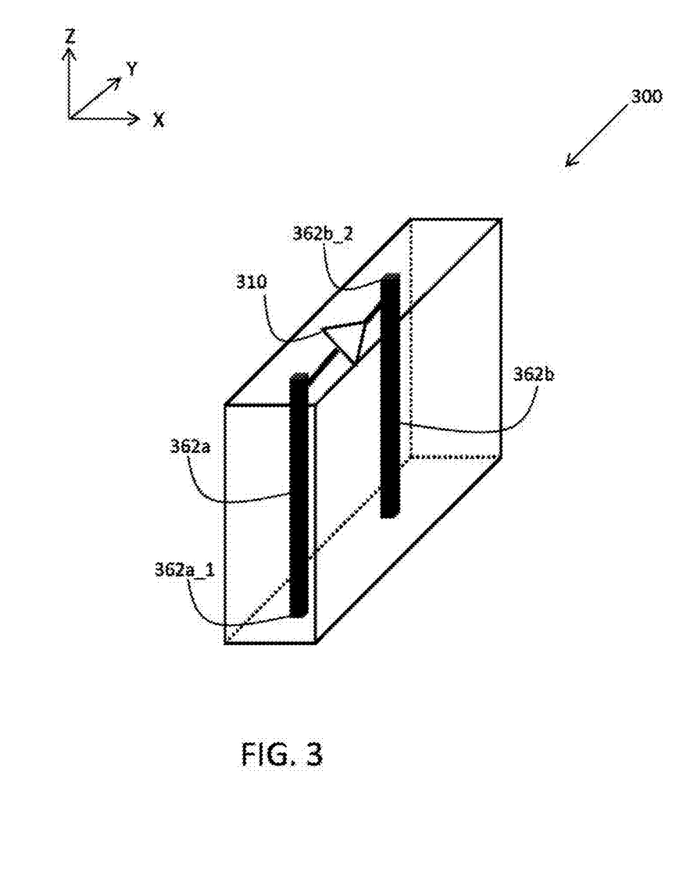
FIG. 3 is a three-dimensional perspective view of a cell 300 in accordance with some embodiments.

FIG. 3 is a three-dimensional perspective view of a cell 300 according to some embodiments. The cell 300 is another example of the cell 152 in FIG. 1. The cell 300 includes ILVs 362a, 362b and a circuit 310. The circuit 310 includes a plurality of devices, e.g., transistors that are generated in the substrate 122 of the second tier 120 and are not shown for simplicity. Input of the circuit 310 is electrically connected to the ILV 362a and output of the block 310 is electrically connected to the ILV 362b. Although FIG. 3 only shows one circuit between the ILVs 362a-362b, any number of circuits may be coupled between the ILVs 362a-362b. In some embodiments, any type of circuits is within the scope of various embodiments. For example, the circuit 310 may be a cell of a standard cell library such as an inverter gate, a buffer gate, an AND gate, an OR gate, a NAND gate, a NOR gate, a XOR gate, a XNOR gate, a multiplexer gate, a latch, a flip-flop, etc. In some embodiments, the circuit 310 is an intellectual property (IP) block to have specific functionalities, such as an adder, a multiplier, a PLL, a slave component in the on-chip bus, etc.

In some embodiments, the cell 130 in FIG. 1 electrically connects through conductive lines and conductive vias in the metallization layer 114 to a port 362a_1 of the ILV 362a in FIG. 3. Furthermore, a port 362b_2 of the ILV 362b electrically connects through conductive lines and conductive vias in the metallization layer 124 to cells 133-134 in FIG. 1. In such a situation, the cell 130 of the first tier 110 in FIG. 1 electrically connects through the ILVs 362a-362b and the block 310 of the cell 300 to the cells 133-134 of the second tier 120 in FIG. 1.

In some embodiments, the cell 300 further includes at least one spare ILV that is not shown for simplicity. In some embodiments, at least one spare gate (not shown) is electrically connected to the spare ILV. In some embodiments, at least one spare gate is electrically connected between two spare ILVs (not shown). The spare gate and spare ILVs mentioned above are reserved in purpose for possible ECO in the future.

Figure 4:
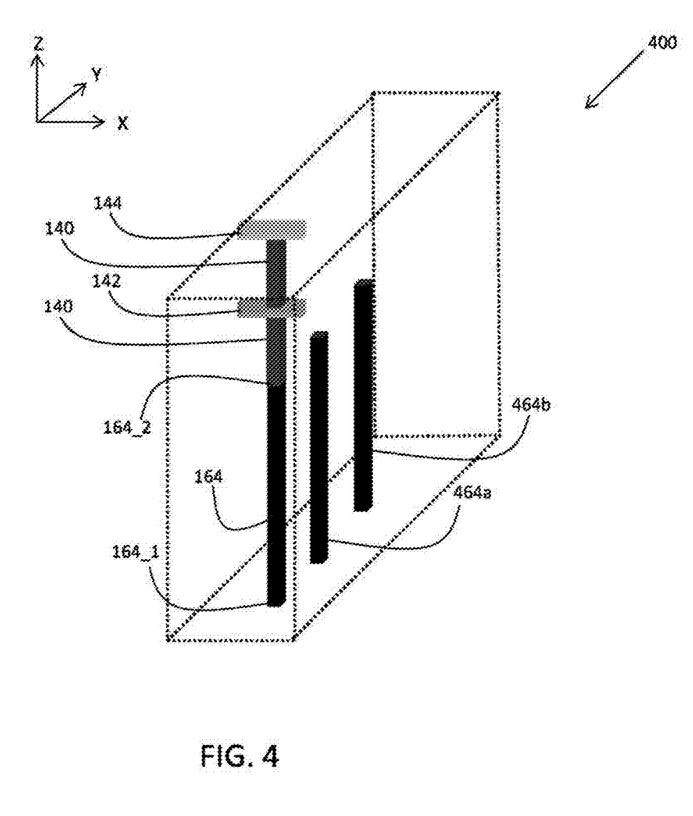
FIG. 4 is a three-dimensional perspective view of a cell 400 in accordance with some embodiments.

FIG. 4 is a three-dimensional perspective view of a cell 400 according to some embodiments. The cell 400 is an example of the cell 154 in FIG. 1. With respect to the embodiments of FIG. 1, like elements in FIG. 4 are designated with the same reference numbers for ease of understanding. The cell 400 includes a ILV 164 with ports 164_1 and 164_2. The port 164_2 of the ILV 164 connects to a metal one line 142 and a metal two line 144 through conductive vias 140 in the cell 400. Although the ILV 164 only connects to one metal one line and one metal two line in the cell 400, any number of metal layers and metal lines connected to the ILV 164 in the cell 400 is within the scope of various embodiments.

In some embodiments, input/output ports of the cell 400 are arranged to be generated on the metal one line 142 and the metal two line 144 connected to the ILV 164. In some embodiments, an EDA routing tool is configured to connect ports on the metal one line 142 in the cell 400 to the cell 135 in FIG. 1 through conductive lines and conductive vias in the metallization layer 124. In some embodiments, the EDA routing tool is configured to connect ports on the metal one line 144 in the cell 400 to the cell 133 in FIG. 1 through conductive lines and conductive vias in the metallization layer 124. Furthermore, the cell 131 connects through conductive lines and conductive vias in the metallization layer 114 to the port 164_1 of the ILV 164 in FIG. 4. As a result, the cell 131 of the first tier 110 in FIG. 1 connects through the cell 400 to the cell 133 and 135 of the second tier 120 in FIG. 1.

In some embodiments, the cell 400 further includes two spare ILVs 464a and 464b. Although there is only two spare ILVs in the cell 400, it is understood that any number of spare ILVs is within the scope of various embodiments. In some embodiments, at least one spare gate (not shown) is electrically connected to one of the spare ILVs 464a and 464b. In some embodiments, at least one spare gate (not shown) is electrically connected between two spare ILVs 464a and 464b. The spare gate and spare ILVs mentioned above are reserved in purpose for possible ECO in the future.

Figure 5:
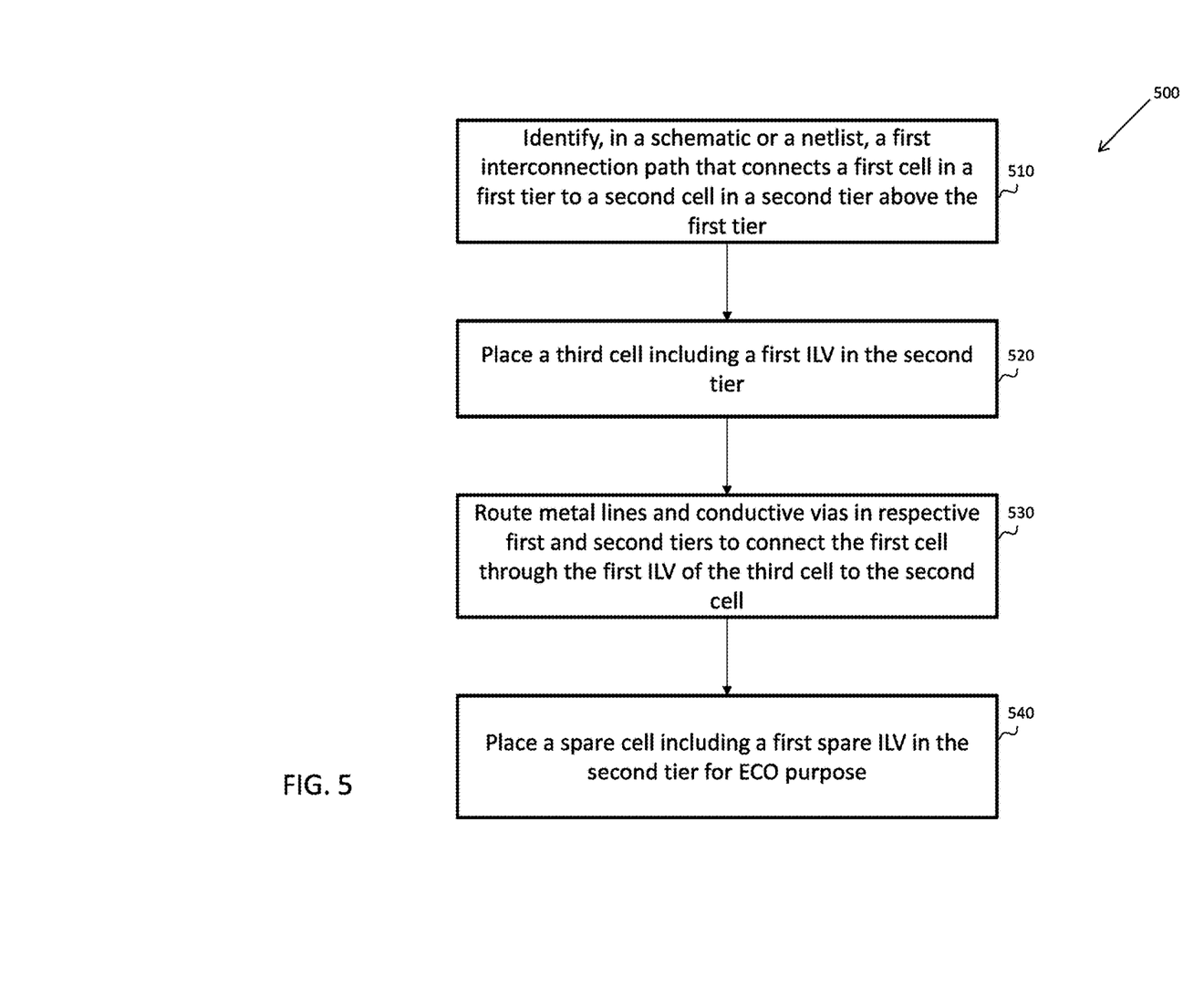
FIG. 5 is a flow chart 500 of a method to connect respective cells in stacked dies of a 3DIC in accordance with some embodiments.

FIG. 5 is a flow chart 500 of a method to connect respective cells in stacked dies of a 3DIC according to some example embodiments.

In operation 510, in a schematic or a netlist of a design database, a first interconnection path is identified to connect a first cell in a first tier to a second cell in a second tier above the first tier. For example, in a schematic or a netlist of the 3DIC 100 in FIG. 1, the first interconnection path is identified to connect the cell 130 in the first tier 110 to the cell 133-134 in the second tier 120 above the first tier 110. The first interconnection path includes the ILV 162 of the cell 152 and metal lines and conductive vias in respective metallization layer 114 and 124. For another example, in the schematic or the netlist of the 3DIC 100 in FIG. 1, the second interconnection path is identified to connect the cell 131 in the first tier 110 to the cell 133, 135 in the second tier 120 above the first tier 110. The second interconnection path includes the ILV 164 of the cell 154 and metal lines and conductive vias in respective metallization layer 114 and 124.

In operation 520, a third cell including a first ILV is placed in the second tier. For example, in FIG. 1, the cells 152 and 154 are placed in the substrate 122 of the second tier 120.

In operation 530, metal lines and conductive vias in respective first and second tiers are routed to connect the first cell through the first ILV of the third cell to the second cell. For example, in FIG. 1, the cell 130 in the substrate 112 of the first tier 110 electrically connects through a first interconnection path to the cells 133-134 in the substrate 122 of the second tier 120. The first interconnection path includes the ILV 162 of the cell 152 and metal lines and conductive vias in respective metallization layer 114 and 124. In some embodiments, the third cell further includes a second ILV that is a spare ILV and is arranged for ECO purpose.

In operation 540, a fourth cell including a first spare ILV is placed in the second tier for ECO purpose. For example, the cell 200A in FIG. 2A or the cell 200B in FIG. 2B may be placed in the substrate 122 of the second tier 120 for possible ECO purpose.

Figure 6:
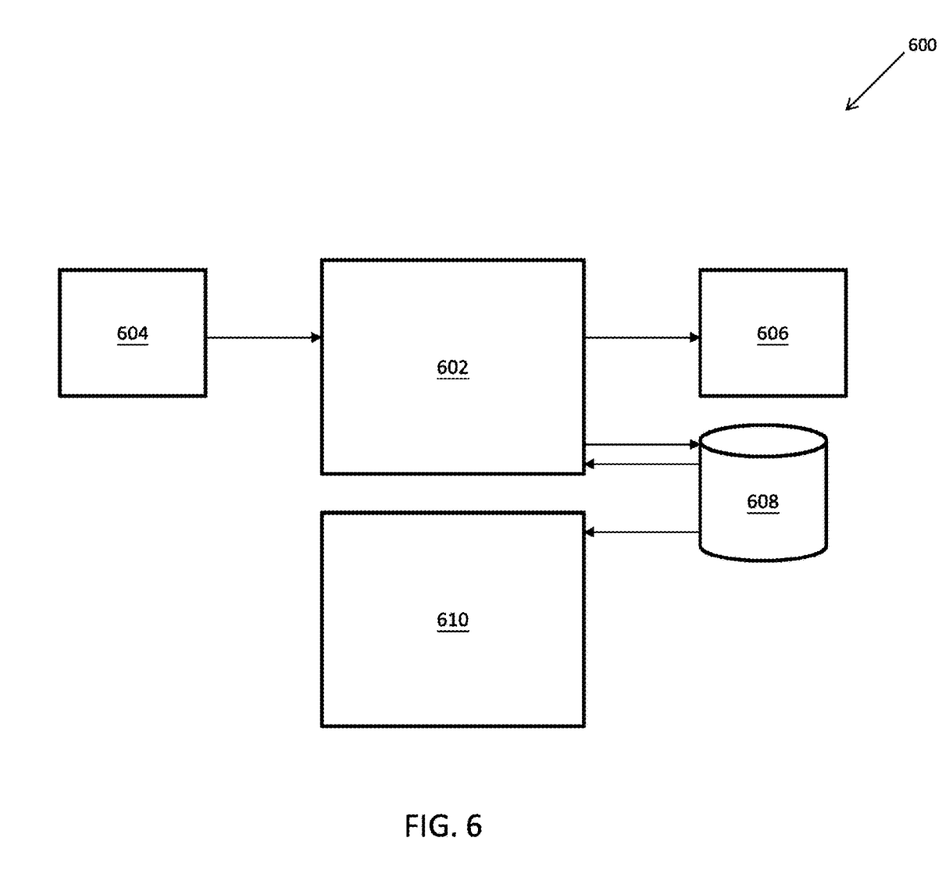
FIG. 6 illustrates a processing system 600 in accordance with some embodiments.

FIG. 6 illustrates a processing system 600 wherein the above described method may be implemented in order to generate one or more of the above described layout (e.g., integrated circuit layout) embodiments. Processing system 600 includes a processor 602, which may include a central processing unit, input/output circuitry, signal processing circuitry, and volatile and/or non-volatile memory. Processor 602 receives input, such as user input, from input device 604. Input device may include one or more of a keyboard, a mouse, a tablet, a contact sensitive surface, a stylus, a microphone, and the like. Processor 602 may also receive input, such as standard cell layouts, cell libraries, models, and the like, from machine readable permanent storage medium 608 (e.g., non-transitory machine readable storage medium). Machine readable permanent storage medium may be located locally to processor 602, or may be remote from processor 602, in which case communications between processor 602 and machine readable permanent storage medium occur over a network, such as a telephone network, the Internet, a local area network, wide area network, or the like. Machine readable permanent storage medium may include one or more of a hard disk, magnetic storage, optical storage, non-volatile memory storage, and the like. Included in machine readable permanent storage medium may be database software for organizing data and instructions stored on machine readable permanent storage medium 608. Processing system 600 may include output device 606, such as one or more of a display device, speaker, and the like for outputting information to a user. As described above, processor 602 generates a layout for an integrated circuit. The layout may be stored in machine readable permanent storage medium 608. One or more integrated circuit manufacturing machines, such as a photomask generator 610 may communicate with machine readable permanent storage medium 608, either locally or over a network, either directly or via an intermediate processor such as processor 602. In one embodiment, photomask generator generates one or more photomasks to be used in the manufacture of an integrated circuit, in conformance with a layout stored in machine readable permanent storage medium 608.

In some embodiments, an apparatus includes a first tier and a second tier. The second tier is above the first tier. The first tier includes a first cell. The second tier includes a second cell and a third cell. The third cell includes a first ILV to couple the first cell in the first tier to the second cell in the second tier. The third cell further includes a second ILV, the first ILV and the second ILV are extended along a first direction. The first tier further includes a fourth cell. The second tier further includes a fifth cell. The second ILV of the third cell is arranged to connect the fourth cell of the first tier with the fifth cell of the second tier. In some embodiments, the second tier further includes a spare cell including a spare ILV for ECO purpose.

In some embodiments, an apparatus includes a first tier and a second tier. The second tier is above the first tier. The first tier includes a first cell. The second tier includes a second cell and a third cell. The third cell includes a first ILV, a second ILV and a block. The block includes logic gates in the standard cell libraries or intellectual property (IP) blocks. The block is electrically connected with the first ILV and the second ILV. The first ILV includes a first port and a second port above the first port. The second ILV includes a third port and a fourth port above the third port. The first cell is electrically connected to the first port of the first ILV. The second cell is electrically connected to the fourth port of the second ILV. The third cell further includes conductive lines and conductive vias coupled to at least one of the first ILV and the second ILV. The third cell further includes a third ILV to serve as a spare ILV for ECO purpose. The second tier further includes a fourth cell including a spare ILV for ECO purpose.

In some embodiments, a method of configuring an apparatus of 3DIC using a processor includes identifying, in a schematic or a netlist, a first interconnection path that connects a first cell in a first tier to a second cell in a second tier above the first tier using the processor. The method also includes placing a third cell including a first ILV in the second tier using the processor. The method further includes routing metal lines and conductive vias in respective first and second tiers to connect the first cell through the first ILV of the third cell to the second cell using the processor. The method further includes placing a fourth cell including a first spare ILV in the second tier for ECO purpose using the processor.

The sequences of the operations in the flow chart 500 are used for illustration purpose. Moreover, the sequences of the operations in the flow chart 500 can be changed. Some operations in the flow chart 500 can be skipped, and/or other operations can be added without limiting the scope of claims appended herewith.

While the disclosure has been described by way of examples and in terms of disclosed embodiments, the invention is not limited to the examples and disclosed embodiments. To the contrary, various modifications and similar arrangements are covered as would be apparent to those of ordinary skill in the art. Therefore, the scope of the appended claims should be accorded the broadest interpretation so as to encompass such modifications and arrangements.

What is claimed is:

1. A method of configuring an integrated circuit layout using a processor, the method comprising:
   identifying, in a schematic or a netlist, a first interconnection path that connects a first cell in a first tier to a second cell in a second tier above the first tier;
   in response to identifying the first interconnection path, placing a third cell including a first inter layer via (ILV) in the second tier;

routing metal lines and conductive vias in respective first and second tiers to connect the first cell through the first ILV of the third cell to the second cell;

generating a set of instructions for generating a mask and for manufacturing a device based upon the integrated circuit layout; and storing the set of instructions in a non-transitory machine readable storage medium, wherein the processor performs at least one of identifying the first interconnection path, placing the third cell in the second tier, or routing the metal lines and conductive vias to connect the first cell to the second cell.

2. The method of claim 1, further comprising placing a spare cell including a first spare ILV in the second tier.

3. The method of claim 1, wherein the third cell in the second tier includes a second ILV to serve as a spare ILV.

4. The method of claim 1, wherein the third cell includes conductive lines and conductive vias coupled to the first ILV of the third cell.

5. A method comprising:
configuring a standard cell layout by:
placing a second tier above a first tier, the first tier including a first substrate of semiconductor material and a first cell partially within the first substrate, the second tier including a second substrate of semiconductor material and a second cell partially within the second substrate and a third cell; and
coupling, with a first inter layer via (ILV) of the third cell, the first cell in the first tier to the second cell in the second tier, the first ILV including a first port connected to the first cell and a second port connected to the second cell;
generating a set of instructions for producing a mask adapted to manufacture an integrated circuit based upon the standard cell layout; and
storing the set of instructions in a non-transitory machine readable storage medium.

6. The method of claim 5, wherein the third cell further includes a second ILV, the first ILV and the second ILV extending along a first direction.

7. The method of claim 6, wherein the first tier further includes a fourth cell, the second tier further includes a fifth cell, and the second ILV of the third cell is arranged to connect the fourth cell of the first tier with the fifth cell of the second tier.

8. The method of claim 6, wherein the third cell further includes a circuit connected with the first ILV and the second ILV.

9. The method of claim 8, wherein the circuit includes at least one cell in a standard cell library or intellectual property (IP) block.

10. The method of claim 8, wherein the first cell of the first tier is arranged to electrically connect, through the first ILV, the circuit and the second ILV to the second cell.

11. The method of claim 5, wherein the third cell further includes conductive lines and conductive vias coupled to the first ILV in the third cell.

12. The method of claim 5, wherein the third cell further includes a second ILV configured to serve as a spare ILV.

13. The method of claim 5, wherein the second tier further includes a fourth cell including a spare ILV.

14. A method comprising:
configuring a standard cell layout by:
locating a second tier above a first tier, the first tier including a first cell having active circuit components, the second tier including a second cell having active circuit components and a third cell, the third cell including a first inter layer via (ILV), a second ILV, and a block;
electrically connecting the block with the first ILV and the second ILV, the first ILV including a first port and a second port above the first port, the second ILV including a third port and a fourth port above the third port;
electrically connecting the first cell to the first port of the first ILV; and
electrically connecting the second cell to the fourth port of the second ILV;
generating a set of instructions for producing a mask adapted to manufacture an integrated circuit based upon the standard cell layout; and
storing the set of instructions in a non-transitory machine readable storage medium.

15. The method of claim 14, wherein the first ILV and the second ILV are extended along a first direction.

16. The method of claim 14, wherein the first tier further includes a fourth cell, the second tier further includes a fifth cell, the third cell includes a third ILV, the third ILV arranged to connect the fourth cell with the fifth cell.

17. The method of claim 14, wherein the block includes at least one cell in a standard cell library or intellectual property (IP) block.

18. The method of claim 14, wherein the third cell further includes conductive lines and conductive vias coupled to at least one of the first ILV and the second ILV.

19. The method of claim 14, wherein the third cell further includes a third ILV to serve as a spare ILV.

20. The method of claim 14, wherein the second tier further includes a fourth cell including a spare ILV.

* * * * *